W. LESSING.
MANUFACTURE OF CEMENT FROM FURNACE SLAG.
APPLICATION FILED AUG. 14, 1908.

998,358. Patented July 18, 1911.

Witnesses:
Edward Zimmer
Wilhelm Wenick

Inventor:
Wilhelm Lessing

UNITED STATES PATENT OFFICE.

WILHELM LESSING, OF TROISDORF, GERMANY.

MANUFACTURE OF CEMENT FROM FURNACE-SLAG.

998,358.  Specification of Letters Patent.  Patented July 18, 1911.

Application filed August 14, 1908. Serial No. 448,543.

*To all whom it may concern:*

Be it known that I, WILHELM LESSING, a subject of the German Emperor, residing at Troisdorf, Rheinland, in Germany, have invented certain new and useful Improvements in the Manufacture of Cement from Furnace-Slag, of which the following is a specification.

This invention relates to an improved method for the manufacture of cement from liquid furnace slag or the like.

In the specification of United States Patent No. 786,573 a process of manufacturing cement is described wherein furnace slag is pulverized together with an admixture of a substance or substances, such as lime, the pulverization being effected by means of a rapidly rotating disintegrating drum or wheel revolving on a horizontal axle. By reason of the high speed of rotation of the drum or wheel strong air currents are produced which scatter or blow away a considerable proportion of the admixture, which consequently does not come into contact with the slag, and is not absorbed by same. The present invention obviates this disadvantage by providing a plurality of suitably arranged disintegrating wheels, so that the slag is thrown from one to another.

The annexed drawings diagrammatically illustrate the manner in which this is done.

Figure 1:
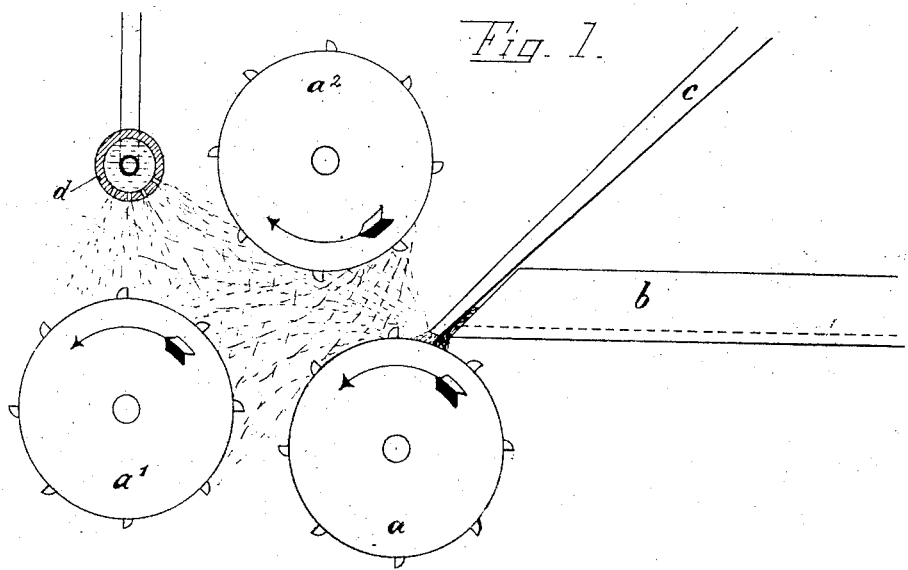

Referring to Figure 1, the drum $a$ has behind it another drum $a^1$, and a third drum $a^2$ is arranged above the drums $a$ and $a^1$. The glowing liquid slag is conducted to the drum $a$ by a trough or channel $b$, and the admixture is led through a trough or channel $c$ terminating near the circumference of the said drum. This drum pulverizes the material in the known manner, and throws part of it against the drum $a^1$ and part of it against the upper drum $a^2$. The drums $a^1$ and $a^2$ rotate in the direction indicated in the drawing by the arrows, so that the material on which they act is thrown from one to the other, and is in this manner very intimately mixed. The repeated impact of the material against the rapidly rotating drums causes it to be reduced to a much finer state of pulverization than heretofore, and owing to the fact that the ingredients are brought into more intimate contact with each other a better agglomeration results.

Figure 2:
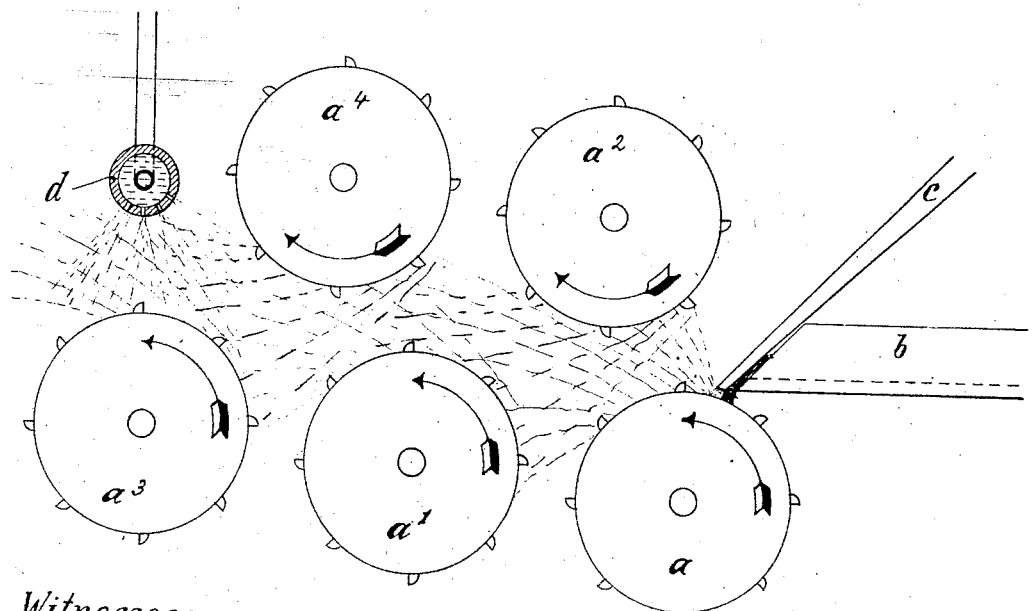

If the temperature of the slag is very high, or the stream of slag is very powerful, it is advisable to provide beyond the drums $a^1$ and $a^2$ additional, similarly arranged drums $a^3$, $a^4$ as shown in Fig. 2, so that the mixture travels as it were over a train of rolls. The fact that at a suitable height above the lower drums $a$, $a^1$, $a^3$, there are drums $a^2$ $a^4$ rotating in the opposite direction effectively prevents the blowing away and scattering of the substance added to the slag, since each pair of drums in the series has a suctional effect upon the material, whereas in the case of a single drum the effect is, of course, dispersive. With the arrangement shown in Fig. 2 the additional drums act upon the already treated material projected from the circumferences of the preceding drums, so that the mixing and agglomerating action is rendered still more effective, the ingredients being repeatedly brought into close contact with each other and atomized.

As is known, furnace slag which has not been granulated in water and has a high percentage of lime crumbles, on cooling, to so-called slag meal, which is practically useless for the manufacture of cement. But furnace slag which is poor in lime, that is to say, slag containing not more than about 47 per cent. of lime, does not crumble on cooling, but forms hard lumps. If liquid furnace slag of this kind, that is to say slag which is poor in lime, becomes saturated with lime in the course of the process to which this invention relates, and is not sufficiently cooled sufficiently quickly, the lumps formed on cooling crumble in part to powder, and this powder, though suitable for cement, is not so valuable as if the material had been more rapidly cooled during the treatment. If the cooling is sufficiently rapid, durable lumps are formed, which do not crumble by themselves but have to be ground or crushed, and then furnish a cement of better quality.

If the flow of slag is so powerful, or its temperature so high, that the mixture is not sufficiently cooled by the air during the pulverizing or atomizing process, it is cooled artificially. This can be effected by introducing a suitable quantity of cooling liquid directly after the pulverizing process. For this purpose the last of the lower drums may be arranged somewhat beyond the upper drum or the last of the upper drums, and cooling liquid may be allowed to fall on the projecting drum in the form of a fine spray, for example from a rose $d$. The cooling liquid is thus atomized and enters the mixture in a finely divided state, so that the cooling is not only accelerated, but also rendered more uniform. If, for this purpose, liquids are used which contain the requisite admixtures in solution, for example lime-water, lime-lye or other alkaline solutions, the mixture is further enriched with cement-forming raw materials, in a very finely divided and uniformly distributed state. At the same time the subsequent swelling of the cement is prevented. The latter effect may be still more efficaciously prevented by adding barium salt solutions and barium carbonate solutions to the mixture. It has also been found that the slag is considerably improved by adding alkaline or earth-alkaline salts, which may either be ground with the slag or added thereto after the grinding.

What I claim as my invention, and desire to secure by Letters Patent of the United States is:—

1. The method of manufacturing cement from liquid furnace slag consisting in subjecting the slag in a divided condition to repeated impacts in the presence of an aeriform current carrying additional cement forming material.

2. The method of manufacturing cement from liquid furnace slag consisting in subjecting the slag in a divided condition to repeated impacts in the presence of an aeriform current carrying additional cement forming material and subsequently applying cooling liquid thereto.

3. The method of manufacturing cement from liquid furnace slag consisting in subjecting the slag in a divided condition to repeated impacts in the presence of an aeriform current carrying additional cement forming material and subsequently applying water containing cement improving material thereto.

4. The method of manufacturing cement from liquid furnace slag consisting in repeatedly projecting the slag in a divided condition by successive impacts across the direction of an aeriform current carrying additional cement forming material.

5. The method of manufacturing cement from liquid furnace slag consisting in repeatedly projecting the slag in a divided condition by successive impacts across the direction of an aeriform current carrying powdered lime in suspension.

6. The method of manufacturing cement from liquid furnace slag consisting in repeatedly projecting the slag in a divided condition by successive impacts across the direction of an aeriform current carrying additional cement forming material and subsequently applying cooling liquid thereto.

7. The method of manufacturing cement from liquid furnace slag consisting in repeatedly projecting the slag in a divided condition by successive impacts across the direction of an aeriform current carrying additional cement forming material and subsequently applying water containing cement improving material thereto.

8. The method of manufacturing cement from liquid furnace slag consisting in repeatedly projecting the slag in a divided condition by successive impacts across the direction of an aeriform current carrying powdered lime in suspension and subsequently applying water containing cement improving material thereto.

In witness whereof I have signed this specification in the presence of two witnesses.

WILHELM LESSING.

Witnesses:
 LOUIS VANDORN,
 H. STELZER.